United States Patent [19]
Schneider

[11] 3,977,706
[45] Aug. 31, 1976

[54] PIPE ELBOW

[76] Inventor: Johann Friedrich Schneider, Roemerstrasse 33, D-638 Bad Homburg, Germany

[22] Filed: Jan. 12, 1976

[21] Appl. No.: 648,464

Related U.S. Application Data
[63] Continuation of Ser. No. 530,365, Dec. 6, 1974, abandoned.

[30] Foreign Application Priority Data
Dec. 24, 1973 Germany............................ 2364552

[52] U.S. Cl............................. 285/157; 29/157 A; 29/416; 228/171; 285/179; 285/286
[51] Int. Cl.² ........................................ F16L 43/00
[58] Field of Search.................. 285/286, 179, 157; 228/171, 170; 29/157 A, 416

[56] References Cited
UNITED STATES PATENTS
| | | | |
|---|---|---|---|
| 1,066,223 | 7/1913 | Rendchen | 285/157 X |
| 2,147,431 | 2/1939 | Ewing | 285/179 |

OTHER PUBLICATIONS
Fabrication of Oxy–Acetylene Welded Steel and Wrought Iron Piping, The Linde Air Products Company, pp. 27, 28, 29 and 40.

*Primary Examiner*—Thomas F. Callaghan
*Attorney, Agent, or Firm*—W. G. Fasse; W. W. Roberts

[57] ABSTRACT
A pipe elbow or bend has a pair of adjacent straight pipe sections joined together on one side of a center line of each pipe section, and a wedge shaped insert of a segment of pipe of the same diameter joining the straight pipe sections on the other side of the respective center planes, whereby a Y-shaped joint is formed in the elbow on each side of a plane of symmetry perpendicular to the center planes of the pipe section. The elbow may be formed by serving a straight pipe along a plane normal to the axis of the pipe on one side of the center plane thereof and along a pair of planes at acute angles to the axis of the pipe on the other side of the center plane, to form a pair of pipe sections and a pipe segment. The edges of the pipe sections formerly connected to the pipe segment are joined together, and the pipe segment is joined to the ends of the pipe sections at the other side of their respective center planes.

1 Claim, 3 Drawing Figures

PIPE ELBOW

This is a Continuation, of application Ser. No. 530,365 filed Dec. 6, 1974 and now abandoned.

BACKGROUND OF THE INVENTION

This invention relates to pipe elbows or bends and concerns such pipe elbows or bends in such a construction that they can be produced substantially more easily and more cheaply than hitherto. These pipe elbows also eliminate the known pipe bends, particularly in the case of pipe conduits of large diameters, as they are too expensive, too difficult or impossible to produce.

The previous pipe elbows comprise portions which are trapezoidal as viewed from the side and which adjoin each other in such a way that the shorter sides of the trapezoids are towards the centre point of the elbow.

In order to make such pipe portions, they were cut in a suitable manner from a straight pipe. This resulted in waste portions being formed between adjacent portions of the pipe elbow, and such waste portions had only scrap value.

OBJECTS OF THE INVENTION

By virtue of the construction of the pipe elbows in accordance with the invention, the material of a straight pipe is used completely, that is to say, without waste, and this applies advantageously up to the largest pipe diameters, using the corresponding pipes and pipe standards.

SUMMARY OF THE INVENTION

The object of the invention is achieved in that the join lines between adjacent pipe portions are of a Y-shaped configuration on both sides of and perpendicular to the plane of symmetry of the elbow, and that the points of intersection of the lines of each Y-shape lie in the centre plane of the elbow, such plane being perpendicular to the plane of symmetry.

BRIEF FIGURE DESCRIPTION

An embodiment of the subject of the invention is illustrated by way of example in diagrammatic form in the accompanying drawing, in which.

DETAILED DESCRIPTION OF THE EXAMPLE EMBODIMENTS

Figure 1:
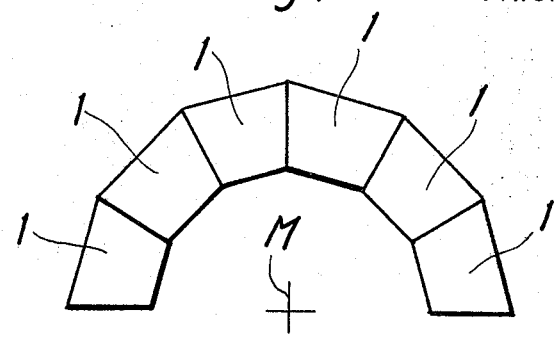
FIG. 1 shows the known construction of the pipe elbow.
Figure 2:
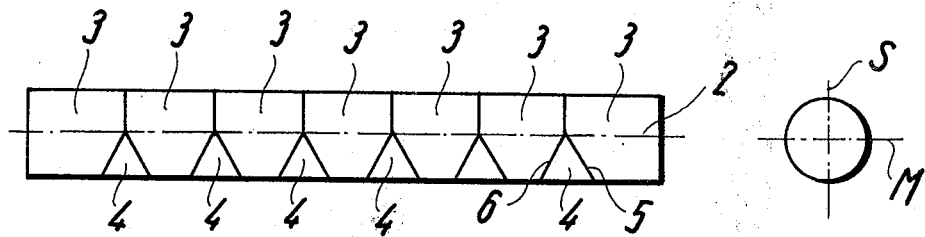
FIG. 2 shows the manner of division in which a straight pipe is cut into pipe portions in accordance with the invention and FIG. 3 shows the pipe elbow according to the invention.

The known pipe bend as shown in FIG. 1 comprises trapezoidal portions 1 which are cut out from a straight pipe and then formed into a pipe elbow in such a way that the shorter sides of each trapezoidal portion are towards the centre point M of curvature of the pipe elbow or bend.

To produce the pipe elbow according to the invention, with, if necessary, different angles of inclination, a straight pipe 2 is cut into portions in such a way that the portions 3 are separated from each other by Y-shaped cuts. When this is done a respective wedge-shaped portion 4 is formed between each two adjacent portions 3.

To form the pipe elbows, the wedge portions 4 are removed and the adjacent portions 3 are tilted in such a way that the separation lines 5 and 6 between a wedge portion 4 and the adjacent portions 3 come into contact with each other.

Figure 3:
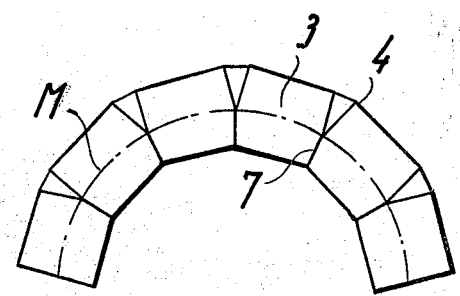

The wedge portions 4 are fitted from the opposite side into the gap formed by the tilting of the portions 3, as is clearly apparent in FIG. 3.

The edges 5 and 6 of adjacent portions 3 form the inner half 7 of each Y-shaped seam, while the points of intersection of the lines of each Y-shape lie in the centre plane of the elbow or bend, which is perpendicular to the plane of symmetry thereof.

The invention is not limited to the embodiment described above and illustrated in the accompanying drawing, on the contrary changes can be made without thereby departing from the general concept of the invention.

I claim:

1. A pipe elbow or bend comprising at least two pipe sections and a gusset cut from a continuous piece of pipe having a longitudinal central axis, said pipe sections being secured to each other along a seam forming a Y-configuration, said sections and gusset resulting from making three cuts into said continuous piece of pipe, one cut running from one side into said pipe in a plane extending at a right angle relative to said longitudinal central axis, a further cut extending from the opposite side into the pipe at a given angle relative to said plane, and to a point where the further cut meets the first mentioned cut, and a third cut extending also from the opposite side of the pipe at said given angle relative to said plane but opposite said further cut, said third cut also running to said point so that all three cuts meet whereby the gusset is formed by the further and third cut, said Y-configuration of the seam resulting from removing the gusset from between the further and third cut, connecting the edges of the pipe sections along the further and third cut to each other, whereby the edges of the first cut move apart sufficiently to fit said gusset between the edges of the first cut, and connecting the gusset to the edges of the first mentioned cut whereby waste is substantially avoided.

* * * * *